United States Patent [19]

Brown et al.

[11] 4,331,937
[45] May 25, 1982

[54] STABILITY ENHANCED HALIDE LASERS

[75] Inventors: Robert T. Brown; William L. Nighan, both of Manchester, Conn.

[73] Assignee: United Technologies Corporation, Hartford, Conn.

[21] Appl. No.: 132,018

[22] Filed: Mar. 20, 1980

[51] Int. Cl.³ .............................................. H01S 3/97
[52] U.S. Cl. ........................................ 372/74; 372/57
[58] Field of Search .................. 331/94.5 G, 94.5 PE, 331/94.5 S, 94.5 T

[56] References Cited

U.S. PATENT DOCUMENTS 3,702,973  11/1972  Daugherty et al. ......... 331/94.5 PE
4,196,399   4/1980  Cason et al. ................ 331/94.5 PE
4,230,994  10/1980  Bradley ....................... 331/94.5 PE

OTHER PUBLICATIONS

Brown et al., "Instability Onset in Electron-Beam-Sustained KrF* Laser Discharges," App. Phys. Lett. 32(1), Jun. 1, 1978, pp. 730-733.
Nighan, "Plasma Processes in Electron-Beam Controlled Rare-Gas Halide Lasers," IEEE JQE, vol. QE14, No. 10, Oct. 1978, pp. 714-726.

Primary Examiner—James W. Davie
Attorney, Agent, or Firm—M. P. Williams

[57] ABSTRACT

The onset of electric discharge instability in electron beam enhanced electric discharge lasers employing halides, such as rare-gas monohalides (e.g., KrF*) and mercury vapor halide (e.g., HgBr*), is delayed by limiting the production of secondary electrons during laser pulse generation, to account for critical loss of halogen or halide fuel. Secondary electron production is controlled, in order to extend the pulse duration before the onset of discharge instability, by temporal tailoring of the primary electron concentration in the electric discharge region across the temporal expanse of possible laser action; the population of primary electrons can be temporally restrained by temporal decrease of the current density of the electron gun output, as a function, for instance, of gun driving voltage, or by temporal defocusing of the electron beam so as to provide reduced densities within the electric discharge region. Secondary electron production is also controlled by tailoring the production of rare-gas metastables. The production of metastables is controlled, in turn, by temporal tailoring of the electric field so as to provide a decreasing electric field to neutral particle density ratio across the temporal expanse of the laser pulse.

6 Claims, 3 Drawing Figures

FIG. 3

STABILITY ENHANCED HALIDE LASERS

The Government has rights in this invention pursuant to Contract No. N00014-78-C-0830.

DESCRIPTION

1. Technical Field

This invention relates to halide lasers, and more particularly to electrically enhancing the stability of the electric discharge used to excite such lasers.

2. Background Art

In many applications, efficient laser sources having output wavelengths in the ultraviolet/visible region of the electromagnetic spectrum are required. Therefore, attention has been directed to the potential of rare-gas monohalides as laser molecules. Much work has been directed to the krypton monofluoride laser, which is a useful example to use in considering some of the problems attendant rare-gas monohalide and mercury halide lasers.

Such lasers depend on electron collisional processes for excitation of the molecule into the upper laser level. Therefore, the lasers can be pumped either by electron guns or by electric discharges. Because the overall processes result in temperature increases on the order of 100° C. per microsecond, and halogen fuel consumption can be on the order of 20%–50% per microsecond, only pulsed operation, of about several microseconds duration, is possible. In order to provide for scalability to large volumes and long pulse lengths (e.g., 1 microsecond) while limiting the burden of the electron beam technology required, the rare-gas monohalide lasers have typically been pumped by means of electron beam sustained electric discharges.

As described in Brown, R. T. and Nighan, W. L., "Instability Onset in Electron-Beam-Sustained KrF* Laser Discharges", Applied Physics Letters 32(11), June 1798, pp. 730–733, the limitation on such electron beam sustained discharges is due to a premature onset of instability (localized arcing), which substantially shorts the electric field, reducing the field below a useful value. This is described in Brown et al as a manifestation of temporal amplification of electron density disturbances (ionization instability). In Brown et al it is shown that significant reduction in the ratio of electric field to neutral particle density in the electrical discharge (E/n), from calculated values determined to be proper for the desired excitation of the lasing species, to lower values that result in stable discharges of longer duration, results in the small signal gain (laser intensity amplification factor) being concomitantly reduced so that there is little if any net improvement in laser output.

A detailed description of numerous characteristics of the processes involved in rare-gas monohalide lasers, which lead to the conclusion that the inherent difficulty of maintaining desired plasma properties in a stable discharge over the temporal extent of a sufficiently long pulse (on the order of a microsecond) is as a consequence of significant changes in the gas mixture arising from the halide lasing species formation process itself, is presented in Nighan, W. L., "Plasma Processes In Electron-Beam Controlled Rare-Gas Halide Lasers", IEEE Journal of Quantum Electronics, Volume QE-14, October 1978, pp. 714–726.

Therefore, although various halide lasers have been shown to have a theoretical capability of useful production of ultraviolet and/or visible laser pulses, scalable into the tens of kilowatt regime, with acceptable efficiencies of on the order of 1% or greater, the practical implementation thereof has been impeded by the inability to maintain stable discharge conditions to acquire a pulse of an adequate duration, with a sufficient laser intensity amplification factor, to render such lasers practical for use.

DISCLOSURE OF INVENTION

Objects of the invention include stabilizing discharges in electron beam sustained, electric discharge rare-gas monohalide lasers.

According to the present invention, the onset of instability in the electric discharge of an electron beam sustained electric discharge halide laser is delayed by temporal tailoring of the properties of electron beam sustained electric discharge, to control the production of secondary electrons. In further accord with the present invention, the temporal tailoring of the electron beam sustained electric discharge may control the production of secondary electrons directly by controlling the current density of primary electrons injected into the electric discharge. In further accordance with one aspect of the invention, the current density of primary electrons in the electric discharge region is temporally descreased by means of concomitant temporal decrease of the current density output of the electron beam gun; in further accordance with another aspect of the invention, the current density of primary electrons in the electric discharge region is temporally decreased by temporal defocusing of the current output of the electron beam gun. In accordance further with the present invention, the temporal restraint in the rate of production of secondary electrons in the electron beam sustained electric discharge is controlled indirectly by temporal reduction of the rate of production of rare-gas metastables, which are dominant in one process of secondary electron production, by temporally decreasing the electric field to neutral particle density ratio during the temporal extent of laser pulse production.

The present invention provides a variety of means, all readily implementable utilizing apparatus and techniques which are known in the art in the light of the teachings which follow hereinafter, either singly or in combination, for providing significant delay in the onset of electric discharge instability in electron beam sustained electric discharge rare-gas monohalide lasers, without reducing the level of lasing specie excitation, thereby to provide significant increases in the efficiency thereof.

Other objects, features and advantages of the present invention will become more apparent in the light of the following detailed description of exemplary embodiments thereof, as illustrated in the accompanying drawing.

BEST MODE FOR CARRYING OUT THE INVENTION

For a better understanding of the present invention, in the light of the exemplary embodiments described hereinafter, a brief summary of some of the processes, and the consequences thereof, involved in electron beam sustained electric discharge rare-gas monohalide lasers, is useful. The following discussion is best understood with appropriate reference to the Table of Nomenclature, Table of Processes, and Table of Equations, hereinafter. For the most part, the invention is described using KrF* lasing species, with Ar buffer gas, as an example. Other examples are cited. The electron beam sustained electric discharge halide laser includes a variety of processes in order to provide laser pulses with a sufficient laser intensity amplification factor. Typically, an electron beam is established, following which an electric field is created. Typically, on the order of fifty to one hundred nanoseconds may be provided in order for maximum current density of the electron beam gun output to be achieved prior to establishing the electric field, in order to minimize power utilization. A suitable gas mixture, such as 0.95 argon, 0.05 krypton, and 0.005 fluorine, is present in the laser cavity across which the electric field is established and into which the electron beam is deposed. The high energy, primary electrons from the electron beam source collide with all of the molecules in the mixture, creating secondary electrons. Since the kinetics of the electron-fluorine collisions are not productive of significant numbers of electrons, the creation of secondary electrons by means of collision with primary electrons is substantially limited to argon and krypton, as set forth in processes 1 and 2 hereinafter. The electric field accelerates the secondary electrons, and is designed to provide, for the kinetics involved, secondary electrons of an energy level which are, on average, highly productive of krypton atoms excited to the first electronic energy state (process 3, hereinafter). The excited krypton atoms collide with the fluorine molecules to produce excited krypton monofluoride molecules and fluorine atoms (process 4, hereinafter); the excited krypton monofluoride first electron energy state is an upper laser leverl, so that the excited molecule radiates (providing useful laser output energy) and reduces to the ground state. The ground state krypton monofluoride is repulsive, and the atoms dissociate, being unable to survive in the ground state. In a similar fasion, suitably energized secondary electrons also collide with ground state argon atoms to provide argon atoms excited to the first electronic energy state thereof (process 5, hereinafter) which in turn collide with fluorine molecules to provide argon monofluoride in a first electronic state and fluorine atoms (process 6, hereinafter). The excited argon monofluoride molecules collide with ground state krypton atoms to form excited krypton monofluoride molecules and ground state argon atoms in an exchange collisional process (process 7, hereinafter). Thus, the lasing species (excited krypton monofluoride) is created directly through the generation of krypton metastables, and less directly through the creation of argon metastables.

As the process proceeds, the population of the fluorine fuel molecules is depleted because the re-association of the ground state fluorine atoms into molecules, at densities useful in the processes herein, is much slower than the other, related processes. As a consequence, the population of rare-gas metastables (the excited argon and krypton) continue to increase across the temporal extent of the laser pulse generation. Some of the secondary electrons (and of course the relatively few, by comparison, primary electrons), colliding with the rare-gas metastables, excite these atoms sufficiently for electron production, creating further secondary electrons (processes 8 and 9, hereinafter). This sequence of processes generally leads to a condition for which there occurs an amplification of electron density disturbances which can be locally significant at different regions of the electric discharge, and can increase the local current density to an extent where short circuiting of the electric field occurs, thereby reducing the electric field to an ineffective value, terminating the laser pulse generation process in its entirety.

The only process which has any significance in the consumption of secondary electrons is the electron dissociative attachment of secondary electrons with fluorine molecules (process 10, hereinafter) which forms fluorine ions and fluorine atoms. Since the fluorine molecules available for this process are in competition with those being utilized to form the lasing species, the consumption of fluorine molecule fuel has a multi-ordered dependence upon the time expended in the process. Thus, as fluorine molecules become less available, there is an increased number of rare-gas metastables to provide secondary electrons, and a decreased number of fluorine molecules to consume secondary electrons by means of electron dissociative attachment. Thus, at any given spot within the electric discharge, the instability of the discharge is inherent, being only a function of the time required for the local electron density disturbances to become amplified (that is for processes 1, 2, 8 and 9 to dominate process 10).

An approximate qualitative analysis of these interprocess relationships can be made, considering that electric field stability is maintainable principally when the ionization of metastables is at a rate which is less than the rate of electron dissociative attachment to the fluorine particles. This is approximately represented by Equation A, hereinafter, wherein the factor 2 in the left side of the relationship arises because the metastable concentration varies as the square of the electron density, as is described more fully in the aforementioned Nighan article. This also can be expressed by the requirement that the ratio of metastable ion electron production to electron dissociative attachment must be less than one (Equation B, hereinafter). The factors involved in relationship B can be examined by considering requirements of electron conservation and metastable conservation, broadly, across the entire volume of the electric discharge (in contrast with local disturbances, which cause the onset of localized amplification or avalanching instability). For electron conservation, the production rate of secondary electrons should approximate the rate of consumption of electrons by electron dissociative attachment, as expressed in Equation C, hereinafter. For conservation of rare-gas metastables, the number of metastables produced must approximate the number of metastables which are consumed in providing the lasing species, as set forth in Equation E. In Equation E, the rate of production of metastables is taken to be dependent upon the number of secondary electrons, the number density of all molecules (since the number density of rare-gas molecules is essentially the same, due to the low density of fluorine molecules) times the rate coefficient of metastable production (that is, of processes 3 and 5, hereinafter). Similarly, the bulk process of metastable consumption, on the average across the entire volume of the electric field, is principally dependent upon the production of lasing species (processes 4 and 6, hereinafter) and for proper relationships to ensure a maximally-sustained discharge, is considered not dependent upon the generation of rare-gas ions (processes 8 and 9, hereinafter). Thus, the consumption of metastables is taken as the number density of metastables times the number density of fluorine molecules times the rate coefficient of the production of rare-gas monohalides (processes 4 and 6, hereinafter), as set forth in Equation E. By combining Equations B, D and F, an equality for stable discharge is set forth, approximately, in Equation H. This shows that electric discharge stability bears a cubic dependence upon the number density of the fluorine molecule fuel, and a linear dependence on the ionization rates and metastable production rate in the processes.

Because the fuel molecule ($F_2$ in the example) collisionally deactivates the laser specie molecule (KrF* in the example), and because the fuel molecule ($F_2$) has a high absorption cross section for the wavelength of the laser (about 248 nanometer in the example), the population of the fuel molecule ($F_2$) is critical and must be kept near the optimal concentration (about 0.005 in the example). Therefore, the discharge instability cannot be reduced by increasing the fuel molecule ($F_2$) population.

However, the rate of ionizing ground state atoms ($k_i$) is directly dependent on the density of primary electrons, and may be temporally reduced by temporal decrease of primary electrons in the electric discharge. And, the rate coefficient of ionizing metastables ($k_i^*$) bears little dependence on variations in the electric field (E/n), in the range of permissible electric fields for the overall processes herein. However, the rate coefficient of production of metastables ($k^*$) has a very high degree of dependence on E/n, and therefore is controllable by temporal reduction of the electric field. Therefore, delay of the onset of discharge instability may be affected, according to the invention, by temporal decrease of the primary electron density or of the electric field, or of both in combination.

Table of Nomenclature

Ar = Argon (ground state)
$Ar^*$ = Metastable Argon, excited to the first electronic energy state
$Ar^+$ = Argon ion
ArF* = Argon monofluoride, excited to the first electronic energy state
$e_p$ = primary electrons (from electron gun)
$e_s$ = secondary electrons
$F_2$ = Fluorine molecule (ground state)
F = Dissociated fluorine atom (ground state)
$F^-$ = Fluorine ion
Kr = Krypton (ground state)
$Kr^*$ = Metastable krypton, excited to the first electronic energy state
$Kr^+$ = krypton ion
KrF* = Lasing specie, krypton monofluoride, excited to the first electronic energy state (upper lasing level)
$k^*$ = rate coefficient for production of rare gas metastables, Procs. (3) and (5)
$k_i^*$ = rate coefficient of ionization of rare gas metastables, Procs. (8) and (9)
$k_i$ = rate of ionization of all molecules by primary electrons, Procs. (1) and (2)
$k_F$ = rate coefficient of electron dissociative -continued
Table of Nomenclature attachement, Proc. (10)
$k_Q$ = rate of coefficient of formation of excited rare gas halogen, Procs. (4) and (6)
n = number density of all molecules
n* = number density of rare gas molecules, $Ar^*$, $Kr^*$
$n_F$ = number density of fluorine molecule, $F_2$
$n_s$ = number density of secondary electrons, $e_s$ Table of Equations For a stable electric field, A. $2n^* k_i^* < n_F K_F$ (approx.), so B. $\dfrac{2n^* k_i^*}{n_F k_F} < 1$ (approx.)

For electron conservation,

C. $nk_i \simeq n_s n_F k_F$, so

D. $n_s \simeq \dfrac{nk_i}{n_F k_F}$

For metastable conservation,

E. $n_s n k^* \simeq n^* n_F k_Q$, so

F. $n^* \simeq \dfrac{n_s n k^*}{n_F k_Q}$

Figures 1, 2:
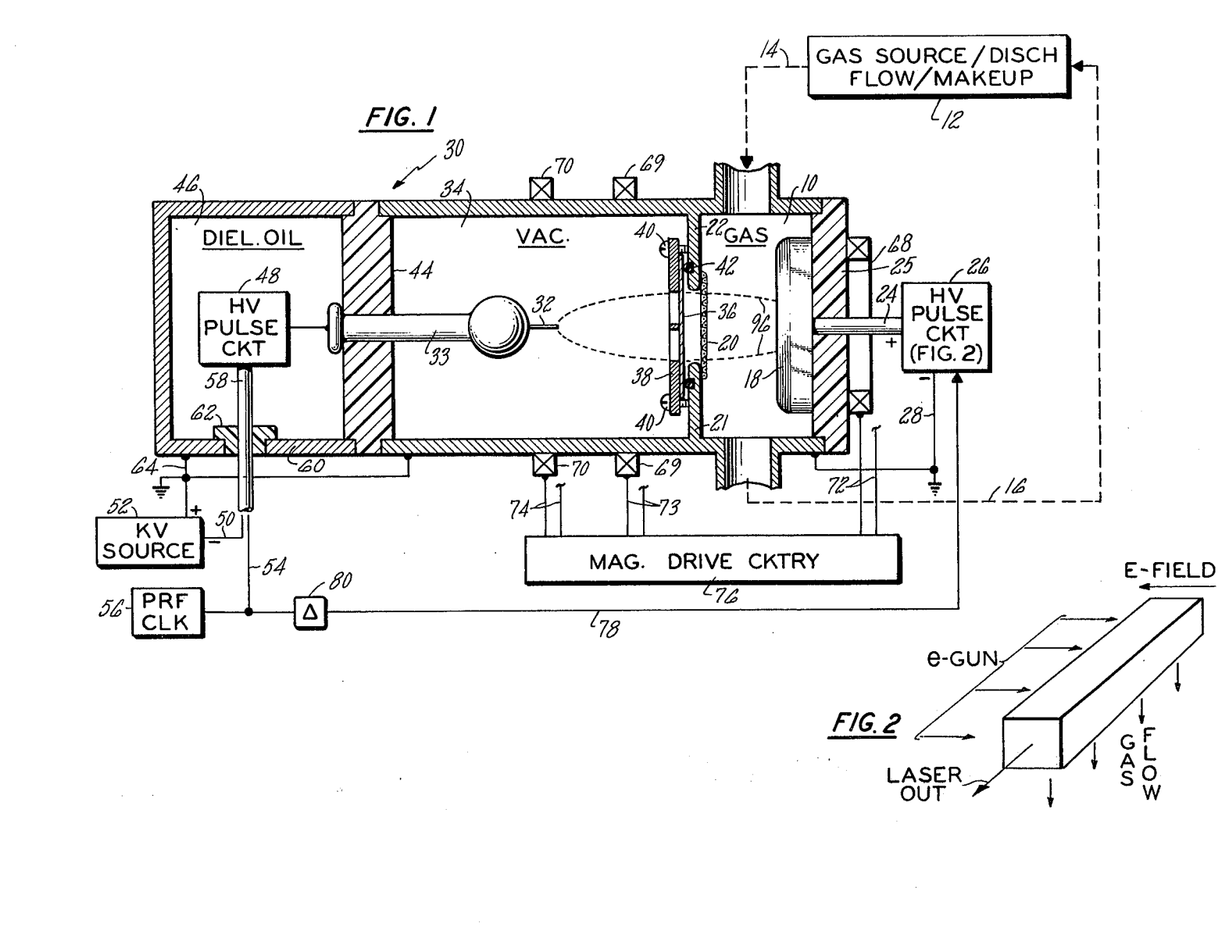
FIG. 1 is a simplified schematic diagram of an electron beam sustained electric discharge, flowing, pulsed rare-gas monohalide laser incorporating the present invention.
FIG. 2 is a simplified illustration of a laser configuration.

Substituting $n_s$ of (D) into (F),

G. $n^* \simeq \dfrac{nk_i}{n_F k_F} \cdot \dfrac{nk^*}{n_F k_Q} \simeq \dfrac{n^2 k_i k^*}{n_F^2 k_F k_Q}$ Substituting n* of (G) into (B), for a stable electric discharge H. $\dfrac{2n^2 k_i k^* k_i^*}{n_F^3 k_Q (k_F)^2} < 1$ Table of Processes 1. $e_p + Ar \rightarrow Ar^+ + e_p + e_s$
2. $e_p + Kr \rightarrow Kr^+ + e_p + e_s$
3. $e_s + Kr \rightarrow Kr^* + e_s$
4. $Kr^* + F_2 \rightarrow KrF^* + F$
5. $e_s + Ar \rightarrow Ar^* + e_s$
6. $Ar^* + F_2 \rightarrow ArF^* + F$
7. $ArF^* + Kr \rightarrow KrF^* + Ar$
8. $e_s + Ar^* \rightarrow Ar^+ + e_s + e_s$
9. $e_s + Kr^* \rightarrow Kr^+ + e_s + e_s$
10. $e_s + F_2 \rightarrow F^- + F$ Referring now to FIG. 1, exemplary laser apparatus incorporates a laser cavity (not shown) disposed within a chamber 10 in which the chemical and electrical processes relating to the invention take place. As illustrated in FIG. 2, the laser gain path (such as between conventional confocal, or other mirrors forming an optical oscillator) is perpendicular both to the electric field and the gas flow in the apparatus of FIG. 1. Thus, in FIG. 1, the laser gain path is perpendicular to the plane of the drawing. In a typical high power laser in which the present invention may be practiced, the laser cavity (that is, the dimension perpendicular to the sheet as seen in FIG. 1) may be on the order of one meter long, and both the height of the chamber (as seen in FIG. 1) and the distance between the cathode and the anode may be on the order of several centimeters or more.

Gas control apparatus 12 is connected by suitable conduits 14, 16 to the chamber 10 and provides a suitable gas mixture, such as 0.95 argon, 0.05 krypton, and 0.005 fluorine. Other gas mixtures may be used, such as different mixture fractions of argon, krypton and fluorine, or such as may be appropriate for other rare-gas halide lasers (e.g., XeF*, using neon, xenon, nitrogen trifluoride mixtures, or XeCl* using neon, xenon, hydrogen chloride mixtures), or mercury-halide lasers (e.g., HgBr using neon, nitrogen, and mercuric bromide or neon, xenon and mercuric bromide), for example. The gas system may be open cycle, providing gas flow from tanks and causing the exit gas to pass through a scavenger system (or to atmosphere) or, may be a closed cycle system including a circulation pump; and perhaps a slight bleed with a makeup gas inlet may be employed. Or a static (no flow) sealed system may be used for single pulse (very low PRF) operation. All of this is within the skill of the art and forms no part of the present invention.

The electric field is provided within the chamber 10 between an anode 18 and a cathode 20. The cathode 20 can vary in its configuration, but may comprise a screen of orthogonal mesh, with twenty, 12-mil wires per inch, or the like. The cathode 20 may be secured to walls 21, 22 of the chamber 10 with a heavy collar (not shown) or by spot welding, since it needs only a limited amount of mechanical stability and electrical contact with the walls of the chamber 10, which are electrical ground.

The anode 18 is provided with a suitable connection 24, within a suitable insulator or insulating wall 25, to the positive output of a high voltage pulse circuit 26, which is described more fully hereinafter with respect to FIG. 3, the negative output of which is grounded to the wall 21 of the chamber 10. This establishes an electric field gradient from the anode 18 to the cathode 20, in the well known fashion.

To provide primary electrons to the process, an electron beam gun 30 includes a thin foil cathode 32, disposed in a vacuum and supported by a low field concentration metallic structure 33. The cathode is disposed in a vacuum chamber 34, which may be evacuated to $10^{-5}$ Torr, or so. The electrons are accelerated toward a thin foil window 36 which separates the vacuum chamber 34 from the atmospheric pressure of the lasing chamber 10. The window 36 may comprise a foil of titanium, stainless steel, aluminum, or the like, and may be on the order of 1 mil thick. The foil window may be on the order of 10×100 centimeters. Support for the foil is provided by a much thicker grate-like structure 38, which may resemble a hibachi grill grating, that is fastened in a suitable way, such as by screws or bolts 40, to the walls 21, 22 of the chamber 10. An O-ring 42 may be provided to ensure a gas-tight seal between the foil window 36 and the walls 21, 22. Thus, the foil is electrically grounded, along with the walls of the chambers 34, 10 and therefore represents the anode of the electron gun.

The electron gun cathode structure 33 is mounted by means of suitable insulator 44 through the wall of a dielectric oil chamber 46, within which high voltage pulse circuitry 48 is disposed. The dielectric oil avoids arcing and corona effects which might otherwise attend the high voltage pulse circuitry 48, since this circuitry may typically operate at several hundred kilovolts. Suitable connections, such as a negative voltage line 50 from a high voltage source 52 and a trigger pulse line 54 from a pulse repetition frequency clock 56, may be made through a conduit 58 that is isolated from the wall 60 of the chamber 46 by means of a suitable insulator 62. The walls 21, 22 and 60 are all at the same ground potential, due to connections 64. The positive side of the kilovolt source 52 is also connected to ground. The electron beam gun 30 comprises a cold cathode gun operative in a space-charge-limited mode. For stable discharges having a high electric field to neutral particle density ratio, current densities in the range of 0.5–2.0 amps per square centimeter are typical. When operating in such a current density regime, it can be shown (to at least a first order approximation) that the current density is dependent upon the three-half power of the cathode driving voltage. Therefore, it can also be shown that current densities can be varied from 0.7 amps per square centimeter to 1.5 amps per square centimeter, as the cathode voltage is adjusted from 200 KeV to 400 KeV. The manner of employing this characteristic in accordance with the invention is described more fully with respect to FIG. 3 hereinafter.

In the embodiment of FIG. 1, three, single-turn magnetic coils 68–70 are connected, by respective suitable connections 72–74, to magnetic driving circuitry 76, which provides suitable currents to the coils 68–70 to focus, or as described more fully hereinafter, to defocus the electron beam. In this example, the coils may comprise single turns of heavy wire, on the order of two cm diameter, and the current in the various coils may be constant, or programmed in accordance with the invention, with magnitudes on the order of 5,000 amps to 30,000 amps.

The magnetic driving circuitry 76 as well as the high voltage pulse circuit 26 may be connected to a delayed pulse repetition frequency clock signal line 78 which is connected through a delay circuit 80 to the pulse repetition frequency clock 56. The delay circuit 80 may cause the electric field 26 to be established a short time (on the order of 70 nanoseconds) after activation of the electron gun 30, so as to conserve energy until maximum current density output of the electron gun is achieved. On the other hand, such a delay need not be used if not deemed desirable in any implementation of the present invention. Similarly, if desired, the high voltage pulse circuit 26 could be arranged, with respect to the pulse repetition frequency clock 56, so as to shut off a short time (such as on the order of 250 nanoseconds) before deactivation of the electron beam, similarly to conserve energy. But, as seen in FIG. 1, this option is not included, since it is not essential to the invention.

As described hereinbefore, a first aspect of the present invention relates to the control over the stability of the electric discharge, by reducing the generation of secondary electrons as a consequence of ionization of metastables, which in turn is controlled by reducing the rate of generation of metastables, as the process proceeds. Since the rate of metastable generation (represented by the coefficient k*) is found to be highly dependent upon the electric field to neutral particle density ratio (E/n), control of this ratio, by control over the intensity of the electric field, will control metastable formation and therefore control the stability of the discharge.

Specifically, it has been found that reduction of the electric field by about 30% from a desirable initial value, across the temporal duration of a roughly one microsecond pulse, will stabilize the discharge throughout the duration of the pulse.

Figure 3:
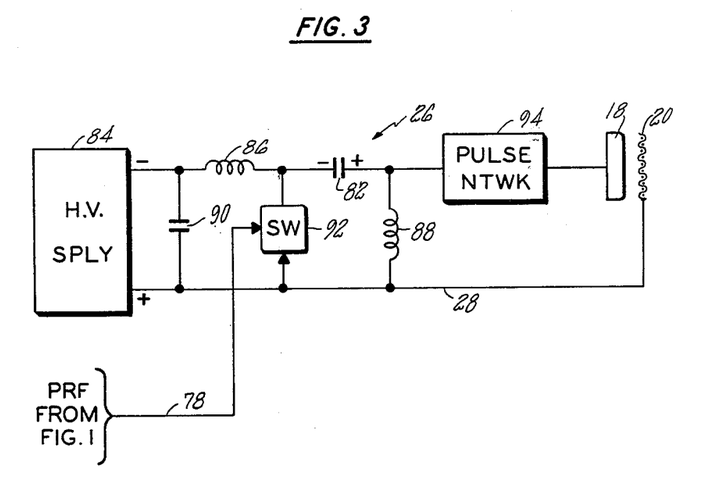
FIG. 3 is a schematic diagram of one form of circuit for providing a temporally decreasing E/n in the electric discharge of the apparatus of FIG. 1.

Referring now to FIG. 3, the high voltage pulse circuit 26 may comprise a conventional slow-charge, rapid-discharge circuitry in which a large capacitor 82 is charged by a high voltage power supply 84, which may be on the order of 10 or 20 kilovolts, through a pair of chokes 86, 88. A capacitor 90 tends to stabilize the high voltage supply output. A suitable electronic or gaseous discharge switch 92 is responsive to a signal on the line 78 (or other signal related directly to the output of the pulse repetition frequency clock 56, FIG. 1) to periodically provide a low impedance discharge path so that the charge stored in the capacitor 82 is discharged across the field between the anode 18 and the cathode 20. The pulse repetition frequency may be on the order of 100 to 1,000 pulses per second, which would provide anywhere from 1 to 10 milliseconds for charging of the capacitor 82, whereas energizing of the switch 92 will cause discharging of the capacitor in a time domain which is several times the length of the desired reaction (on the order of several microseconds). To provide temporal tailoring of the electric field, as described hereinbefore, a pulse forming network 94 is inserted between the capacitor 82 and the anode 18. But the pulse forming network must be designed, in accordance with well known design techniques, to suit the particular laser configuration, gas mixture, cathode/anode spacing, and the like, so as to provide a droop in the electric field (i.e., a peak desired field at the start of the laser pulse, reducing by about 30% thereof one microsecond or so later). Since this will vary in an infinite fashion from one design to the next, the details thereof are not given herein. An example of this aspect of the invention is illustrated in Brown, R. T. and Nighan, W. L., "Stability Enhancement in Electron-Beam-Sustained Excimer Laser Discharges", Applied Physics Letters 35(2), July 1979, pp. 142-144.

A second aspect of the present invention is controlling the creation of secondary electrons within the gas mixture during the laser pulse so as to reduce the total electron population which is achieveable as a consequence of the processes during the laser pulse. This is specifically related to the rate of ionization as a consequence of primary electrons ($k_i$), as described hereinbefore. The cold cathode electron gun 30 (FIG. 1) may be provided with high voltage pulse circuitry 48 which is of a nature similar to that described with respect to the high voltage pulse circuit 26 in FIG. 3. That is, since the current density of the cold cathode electron gun is highly dependent upon the energy and therefore the voltage of the cathode 32, provision of a pulse forming network (such as network 94, FIG. 3) within the high voltage pulse circuitry 48 of the electron gun 30 will similarly provide temporal tailoring of the current density as a function of time, across the very short time domains of the laser pulse (1 to 2 microseconds). Thus, although the source of hundreds of kilovolts 52 (FIG. 1) may be external of the dielectric oil chamber 46, the remainder of the pulse circuitry 48 may take the form of the capacitors 82, 90, the chokes 86, 88, the switch 92 and the pulse forming network 94 illustrated in FIG. 3. Thus, the second aspect of the invention provides temporal tailoring of the rate of production of secondary electrons by means of colisions with primary electrons, by temporal tailoring of the current density of the output of the electron gun 30, which in turn is achieved by temporal tailoring of the high voltage driving source for the cathode 32.

Another aspect of the invention provides control over the rate of the production of secondary electrons by collisions with primary electrons ($k_i$) through the expedient of defocusing the electron beam by means of magnetic fields. This is achieved by causing the coil 68 in FIG. 1 to have a relatively high magnetic field (on the order of 800 gauss), at the start of the laser reaction, while the coils 69 and 70 have relatively low or no fields at the start of the reaction; and decreasing the field generated by the coil 68 while at the same time increasing the fields generated by the coils 69 and 70 as the reaction proceeds (across the expanse of about 1 or 2 microseconds). The fields generated by each of the coils is essentially toroidal, and the electrons will tend to follow paths which are tangential to the net field, thereby being highly focused within the active region shown by the dotted lines 96 at the start of the reaction, and being diffused outwardly as a consequence of the dominance of the fields from the coils 69, 70 near the end of the reaction. Again, this is achieved by having suitable high current pulse forming networks, initiated by signals relating to the pulse repetition frequency clock 56, utilizing well known techniques.

The three aspects of the invention (tailoring the electric field, tailoring the electron beam output, and tailoring the electron beam shape) may be used independently, or in various combinations of two or three of these aspects. In many situations, however, the relative simplicity of controlling the voltage of the cold cathode electron gun renders it the preferable mode of controlling primary electron concentration across the temporal expanse of the reaction (rather than by means of magnetic fields). In some instances, no magnetic fields may be required at all, and in other instances only a single coil may be required (such as the coil 68) in order to provide desired focusing, in dependence upon the particular configuration in which the invention may be practiced.

In the various halide lasers to which the invention appertains, the dominant energy transfer process may be metastable transfer reactions or ion recombination reactions. The laser gas mixtures are characterized herein as employing a buffer gas, an energy transfer gas and a fuel gas. The laser example herein (KrF*) employs Ar as the buffer gas, Kr as the energy transfer gas and $F_2$ as the fuel gas. As described hereinbefore, ArF* is formed and also serves as an energy transfer molecule. The example is principally dependent on the metastable transfer reaction, but also benefits to some degree from an ion recombination reaction of Kr and $F^-$ ions which forms the KrF* laser specie. Another laser in which the metastable transfer reaction is dominant employs Ne as the buffer molecule, $N_2$ as the energy transfer molecule, and $HgBr_2$ as the fuel, to form the HgBr* laser specie. A similar laser employs the same buffer and fuel molecules, but uses Xe as the energy transfer molecule. An example of a laser in which the ion recombination reaction is dominant employs Ne as the buffer gas, Xe as the energy transfer gas and HCl as the fuel, and forms XeCl* as the lasing specie. Various other combinations of these and other molecules containing rare gases, nitrogen and halogen atoms may be used in the gas mixture of a halide laser, and any such halide laser may employ the present invention.

In halide lasers employing the invention the primary electrons ionize any of the molecules of the gas mixture to form secondary electrons; but due to the predominance of buffer gas, the buffer molecules are most involved. Control over the rate of amplification of secondary electron growth, by controlling the production of metastables, in the general case of halide lasers, is primarily related to the energy transfer gas metastables, but in some cases, such as the Ar-Kr-$F_2$ example, this control also involves the buffer gas, such as Ar and ArF* metastables in the example.

Other types of electron guns and electric field high voltage systems may be used while practicing the invention. Temporal tailoring, although readily achieved by pulse forming networks, may be achieved by other expedients. The processes and relationships described for an Ar-Kr-$F_2$ laser herein are similar for halide lasers employing other gas mixtures, some of which are recited hereinbefore. Thus, although the invention has been shown and described with respect to exemplary embodiments thereof, it should be understood by those skilled in the art that the foregoing and various other changes, additions and omissions may be made therein and thereto, without departing from the spirit and the scope of the invention.

We claim:

1. An improved halide pulse laser, pumped by an electron beam sustained electric discharge, including:
    a laser chamber containing a mixture of a buffer gas, an energy transfer gas, and a fuel gas, and providing a laser gain region;
    pulse clock means providing signals indicative of times at which pulsed laser operation is to occur;
    electric discharge means including a pulsed electron gun for injecting a pulse of high energy primary electrons into said laser gain region for ionizing ground state molecules of said mixture to produce secondary electrons at a first rate for which a dominant electrical parameter is the density of primary electrons in said laser gain region, said pulse having a temporal expanse on the order of one microsecond, and including electric field means having a high voltage source connected between an anode and a cathode disposed to provide an electric field in said laser gain region for accelerating secondary electrons to produce metastables at a second rate for which a dominant electrical parameter is the strength of said electric field, and concomitantly ionize metastables and produce additional secondary electrons at a third rate dependent on said second rate;
    wherein the improvement in said electric discharge means delays the onset of electric discharge instability during a pulse of laser operation and comprises:
    means responsive to said pulse clock means for temporally decreasing one of said dominant electrical parameters across the temporal expanse of each laser pulse from a desired initial value, maintained for a predetermined initial time less than a microsecond, to a sustained value that is a large fraction of said initial value, thereby to control one of said rates of production of secondary electrons, as a function of time, during each laser pulse.

2. An improved halide pulse laser pumped by an electron beam sustained electric discharge, including:
    a laser chamber containing a mixture of a buffer gas, an energy transfer gas, and a fuel gas, and providing a laser gain region;
    pulse clock means providing signals indicative of times at which pulsed laser operation is to occur;
    an electron gun having an electron transmissive window within a wall of said laser chamber and disposed to inject high energy electrons into said laser gain region, said electron gun being pulsed in response to signals from said pulse clock means; and
    electric field means including a high voltage source connected between an anode and a cathode disposed on opposite sides of said laser gain region to provide an electric discharge therein;
    wherein the improvement for delaying the onset of instability of the electric discharge comprises tailoring means associated with said electron gun for providing temporally decreasing current density of primary electrons in said laser gain region across the temporal expanse of the laser pulse from a desired initial value, maintained for a predeterined initial time less than a microsecond, to a sustained value on the order of 15% to 30% less than said desired initial value.

3. An improved laser according to claim 2 wherein said electron gun is a cold cathode electron gun and said tailoring means comprises a pulse forming network to reduce the current density output of said cold cathode electron gun.

4. An improved laser according to claim 2 wherein said tailoring means comprises:
    at least two spaced-apart, separately energizeable magnetic coils, a first one of said coils disposed to provide, in response to current therethrough, a magnetic field related to said laser gain region in a manner to concentrate said primary electrons within said laser gain region, and a second one of said coils disposed to provide, in response to current therethrough, a magnetic field related to said laser gain region in a manner to deflect said primary electrons away from said laser gain region; and
    means responsive to said pulse clock means for providing current to said first magnetic coil which decreases from a desired initial value at the start of each laser pulse to a significantly lower value at the temporal end of each laser pulse, and for providing to said second magnetic coil current which increases from a low initial value at the start of each laser pulse to a significantly higher value at the temporal end of each laser pulse, in a manner to cause said primary electrons to be concentrated in said laser gain region at the start of each laser pulse and to be increasingly deflected from said laser gain region across the temporal expanse of each laser pulse.

5. An improved halide pulse laser pumped by an electron beam sustained electric discharge, including:
    a laser chamber containing a mixture of a buffer gas, an energy transfer gas, and a fuel gas, and providing a laser gain region;
    pulse clock means providing signals indicative of times at which pulsed laser operation is to occur;
    an electron gun disposed to inject high energy electrons into said laser gain region, said electron gun being pulsed in response to signals from said pulse clock means; and
    electric field means including a high voltage source connected between an anode and a cathode disposed on opposite sides of said laser gain region, and operated in response to said pulse clock means to provide an electric discharge in timed relationship with the pulsing of said electron gun;
    wherein the improvement for delaying the onset of instability of the electric discharge comprises tailoring means associated with said electric field means for providing said electric field at a desired initial magnitude for a predetermined initial time less than a microsecond at the start of each laser pulse and decreasing the magnitude of said electric field gradually across the temporal expanse of said pulse to a final magnitude at the temporal end of said pulse which is on the order of 20% to 40% less than said initial magnitude.

6. An improved laser according to claim 5 wherein said electric field means comprises a high voltage source connected to said anode through a pulse forming network.

* * * * *

UNITED STATES PATENT AND TRADEMARK OFFICE
CERTIFICATE OF CORRECTION

PATENT NO. : 4,331,937
DATED : May 25, 1982
INVENTOR(S) : Robert T. Brown and William L. Nighan It is certified that error appears in the above—identified patent and that said Letters Patent is hereby corrected as shown below:

Column 1, line 38     "1798" should read --1978--

Column 2, line 25     "descreased" should read --decreased--

Column 3, line 44     "leverl" should read --level--

Column 5, line 34     "$(k_i)$" should read --$(k_i^*)$--

Column 6, line 4      "rate of coefficient" should read --rate coefficient--

Column 9, line 57     "colisions" should read --collisions--

Column 12, line 9     "predeterined" should read --predetermined--

Signed and Sealed this

Tenth Day of August 1982

[SEAL]

Attest:

GERALD J. MOSSINGHOFF

Attesting Officer    Commissioner of Patents and Trademarks